US011661820B2

(12) United States Patent
Dusterhoft et al.

(10) Patent No.: US 11,661,820 B2
(45) Date of Patent: May 30, 2023

(54) SUBSURFACE SAFETY VALVE WITH UNIFORM LOADING

(71) Applicant: Halliburton Energy Services, Inc., Houston, TX (US)

(72) Inventors: Ross Glen Dusterhoft, Carrollton, TX (US); Charles David McFate, Frisco, TX (US); James Dan Vick, Jr., Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 9 days.

(21) Appl. No.: 17/511,757

(22) Filed: Oct. 27, 2021

(65) Prior Publication Data
US 2022/0205338 A1 Jun. 30, 2022

Related U.S. Application Data

(60) Provisional application No. 63/131,201, filed on Dec. 28, 2020.

(51) Int. Cl.
E21B 34/12 (2006.01)
F16K 15/03 (2006.01)

(52) U.S. Cl.
CPC ............ *E21B 34/12* (2013.01); *F16K 15/034* (2021.08)

(58) Field of Classification Search
CPC ................................. E21B 34/12; F16K 15/034
See application file for complete search history.

(56) References Cited

U.S. PATENT DOCUMENTS

| 4,134,455 A * | 1/1979 | Read ..................... E21B 47/117 |
| | | 251/363 |
| 4,825,902 A | 5/1989 | Helms |
| 5,137,089 A * | 8/1992 | Smith ..................... E21B 34/06 |
| | | 251/303 |
| 5,918,858 A | 7/1999 | Rawson |
| | (Continued) | |

FOREIGN PATENT DOCUMENTS

| CN | 102128275 A | 7/2011 |
| JP | 2000130617 A | 5/2000 |

OTHER PUBLICATIONS

International Search Report and Written Opinion dated Feb. 11, 2022 for corresponding PCT Application No. PCT/US2021/056767 filed Oct. 27, 2021.

*Primary Examiner* — Taras P Bemko
(74) *Attorney, Agent, or Firm* — K&L Gates LLP

(57) ABSTRACT

A subsurface safety valve assembly that includes a valve housing comprising a valve seat with a circumference and a seat seal surface. The valve assembly also includes a flapper rotatably connected to the valve housing and comprising a flapper seal surface. The flapper is rotatable into sealing engagement with the seat seal surface in a closed position to form a circumferential surface-to-surface seal. The valve assembly also includes a dovetail groove cut into the seat seal surface or the flapper seal surface and a seal ring held within the dovetail groove and positioned to form a seal against the seal ring when the flapper is in the closed position. The seat seal surface, the flapper seal surface, the dovetail groove, and the seal ring are shaped such that the load on the seal ring is uniform around the seal ring when the flapper is in the closed position.

19 Claims, 11 Drawing Sheets

(56) References Cited

U.S. PATENT DOCUMENTS

| | | |
|---|---|---|
| 6,666,271 B2 | 12/2003 | Deaton |
| 2003/0079880 A1* | 5/2003 | Deaton ................... E21B 34/10 |
| | | 166/334.1 |
| 2003/0121664 A1* | 7/2003 | Hill, Jr. ................... E21B 34/10 |
| | | 166/332.8 |
| 2013/0327974 A1 | 12/2013 | Dyer et al. |
| 2020/0240236 A1* | 7/2020 | Cress ..................... E21B 21/10 |

* cited by examiner

SUBSURFACE SAFETY VALVE WITH UNIFORM LOADING

BACKGROUND

This section is intended to provide relevant background information to facilitate a better understanding of the various aspects of the described embodiments. Accordingly, these statements are to be read in this light and not as admissions of prior art.

Resilient seals are used in subsurface safety valves (SSSVs) for onshore and offshore oil and gas production. Conventional resilient seals are plastic components that fit into the spherical radii of a metal seat. The metal seat connects to a metal-to-metal flapper to form a flapper valve assembly. Current resilient seal designs can encounter performance issues at high temperatures and pressures where the seal can be highly compressed, exposing the metal-metal seal to wearing and eroding forces. A need exists, therefore, for a resilient seal with a design that maintains consistent contacting at high temperatures and pressures.

BRIEF DESCRIPTION OF THE DRAWINGS

Embodiments of a flapper valve assembly with dovetail groove are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
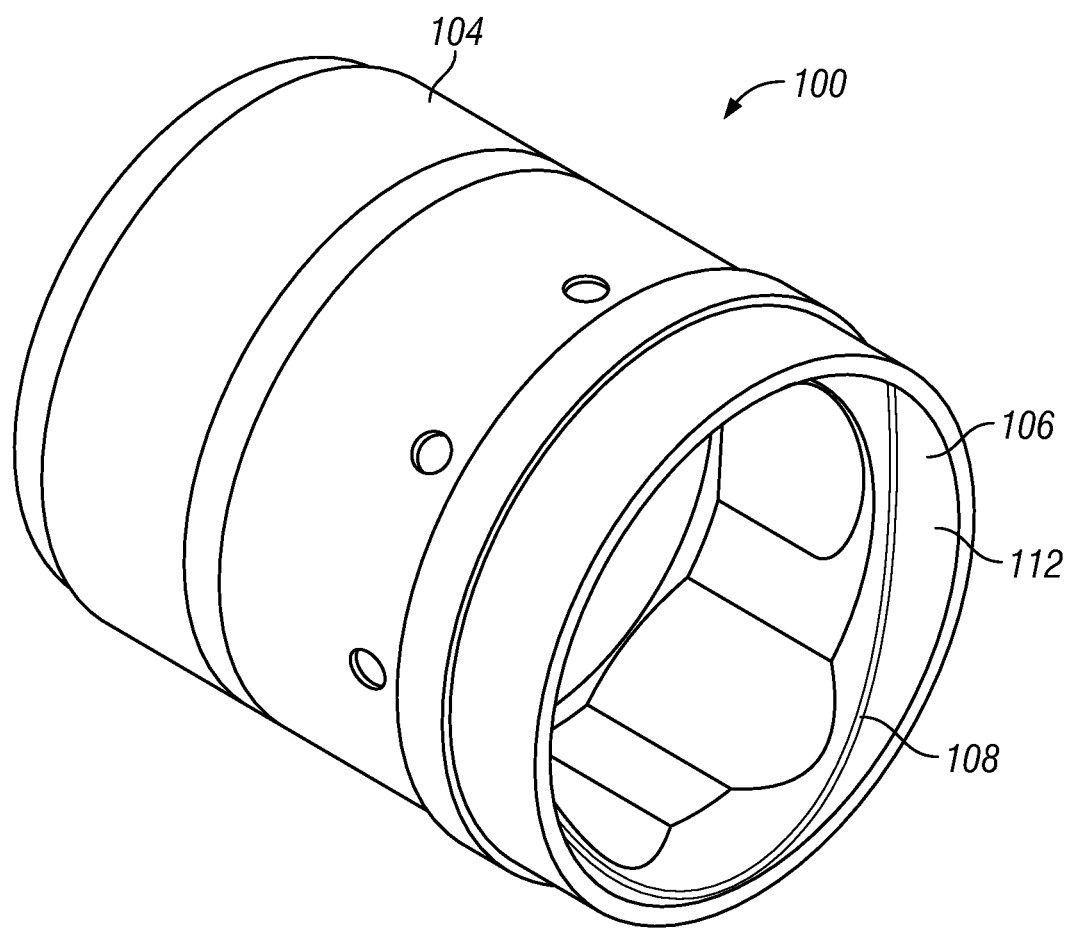
FIG. 1 is a perspective view of a valve housing that includes a valve seat with a dovetail groove, according to one or more embodiments.

The present disclosure describes a flapper valve assembly, comprising a flapper and a valve housing comprising a valve seat with a seal. The valve seat comprises a dovetail groove cut into the valve seat and a seal ring that may comprise an o-ring is secured into the dovetail groove. The flapper rotates into engagement with the valve seat, forming a seal against the seal ring and against the valve seat.

FIGS. 1-4 show an embodiment of a flapper valve assembly 100 that includes a flapper 102, a valve housing 104 including a valve seat 106 with a dovetail groove 108 cut into the valve seat 106 and a seat seal surface 112. The dovetail groove 108 is cut onto a spherical cross section seat projected by an ellipse. A seal ring 110 is placed and held within the dovetail groove 108 by the configuration of the depth of the groove 108 and the groove sidewalls. The overall configuration of the seal ring 110, including shape and material, may be any suitable configuration. For example, the seal ring 110 may be an o-ring as shown. The material of the seal ring 110 may also be resilient, allowing the flapper 102 to contact the seal ring 110 and form a seal consistently around the seal ring 110. The seal ring 110 material may also be a material that retains its shape/functionality when at working temperatures of about 20° F. (−6.67° C.) to about 300° F. (148.89° C.).

As shown, the flapper 102 is connected to the valve housing 104 in a hinged arrangement and is rotatable into sealing engagement with the seat seal surface 112 by a flapper seal surface 111. The dovetail groove 108 is cut in a specific location on the valve seat 106 so that when the flapper 102 and seal ring 110 make contact, the load or pressure on the seal ring 110 is uniform around the seal ring 110 and circumference of the seat seal surface 112. With the dovetail groove 108 and o-ring design, the seal ring 110 will continue to function when at working temperatures. In addition to forming a seal against the seal ring 110, the flapper seal surface 111 and the seat seal surface 112 also form a second surface-to-surface seal in a bearing area of the seat seal surface 112.

Both the flapper 102 and the valve seat 106 may also be metal such that closing the flapper 102 against the valve seat 106 creates the second seal, which can be a metal-to-metal seal. The location and size relationship between the seal ring 110 and the metal seat seal surface 112 can be optimized to maintain an optimum metal-to-metal bearing area for creating the metal-to-metal seal. The groove 108 is also placed to improve the contact surface of the seat seal surface 112. Through FEA analysis, shown in FIGS. 2A and 2B, the radial placement of the groove 108 and bearing area contact is optimized for seal performance and wear optimization. The groove 108 not only provides a space for the resilient seal ring 110 but also enhances the metal-to-metal seat seal surface 112. The groove 108 also retains the seal ring 110 in place during ambient conditions and at working temperatures. The groove 108 allows the seal ring 110, when at working temperatures, to expand without compromising the effectiveness of the seal.

Figure 2A:
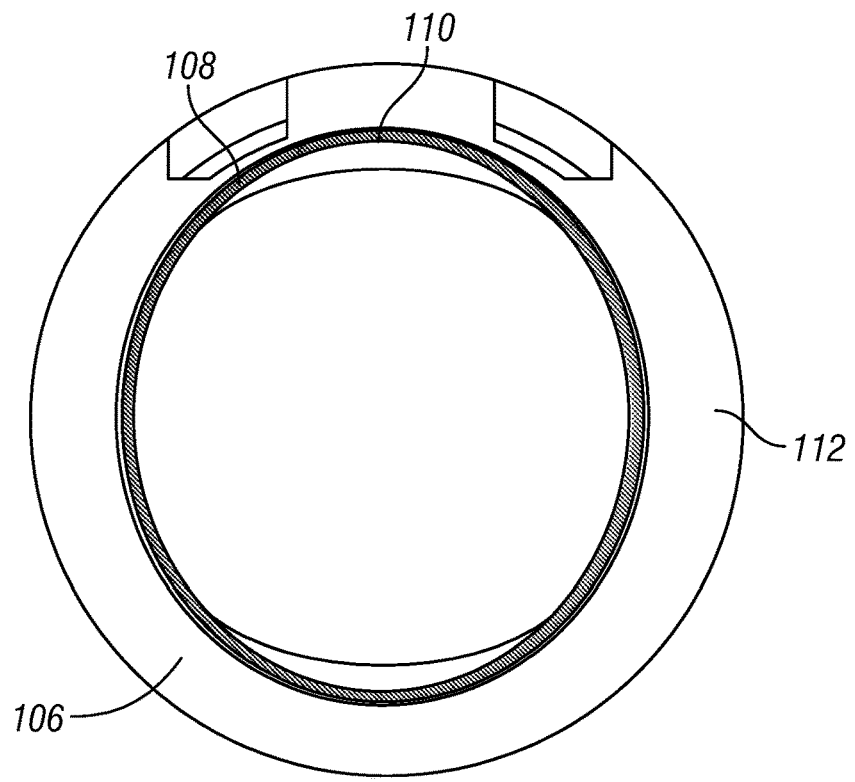
FIG. 2A is a cross section of a valve seat with a dovetail groove at a sealing surface, according to one or more embodiments.
Figure 2B:
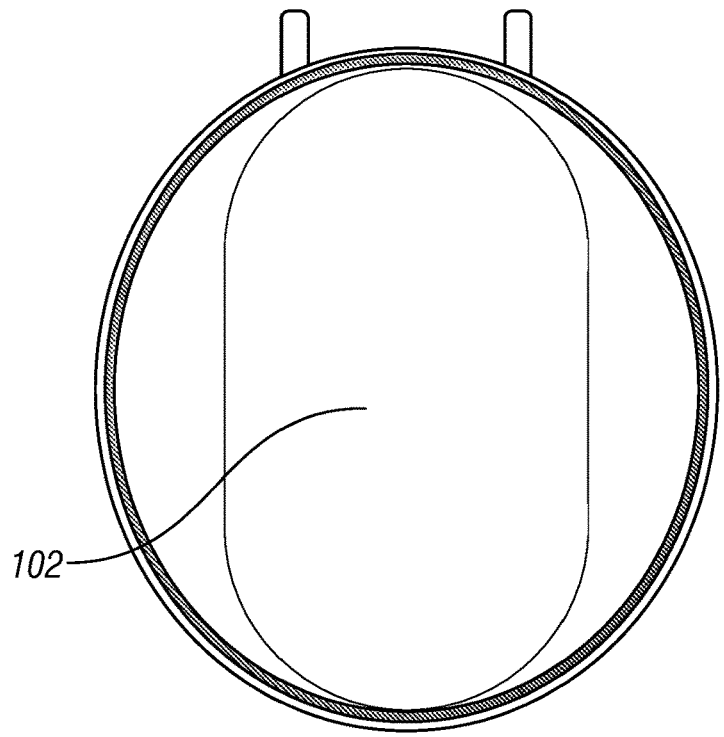
FIG. 2B is a cross section of a flapper at a sealing surface, according to one or more embodiments.

Three configurations of the groove 108 (width, radial distance of the minor diameter, and radial distance of the major diameter) also control the loading of the seat seal surface 112. Due to the saddle shape and curvature of the seat 106, the contact between the flapper 102 and seat 106 is a shape that is not uniform in cross section without the groove 108. With the groove 108 added, a near-uniform seat seal surface 112 cross-section can be created as shown in FIGS. 2A and 2B.

Typically, there is a compromise between seal capability of a seal ring 110 vs. the metal-to-metal seat seal surface 112 in that the addition of a seal ring 110 would degrade the performance of the seat seal surface 112. This compromise is avoided with the flapper valve assembly 100 and seal ring 110. By adding the groove 108 to the flapper valve assembly 100, the effectiveness of the seat seal surface 112 is improved. The groove 108 allows the flapper 102 to maintain a continuous and uniform load sealing contact area. This allows the flapper 102 to seal on the seat seal surface 112 uniformly. The benefit is twofold. First, the flapper valve assembly 100 performance is improved by optimized and uniform contact forces on the seat seal surface 112. Second, the seal formed by the resilient seal ring 110 enhances sealing performance.

In addition, the field-proven structural shape of the flapper 102 and the valve seat 106 along with the associated equipment (torsion spring, pin, equalizing features, flapper retains etc.) is utilized. By utilizing this familiar structure, the performance in slam closure will be comparable.

Figure 3:
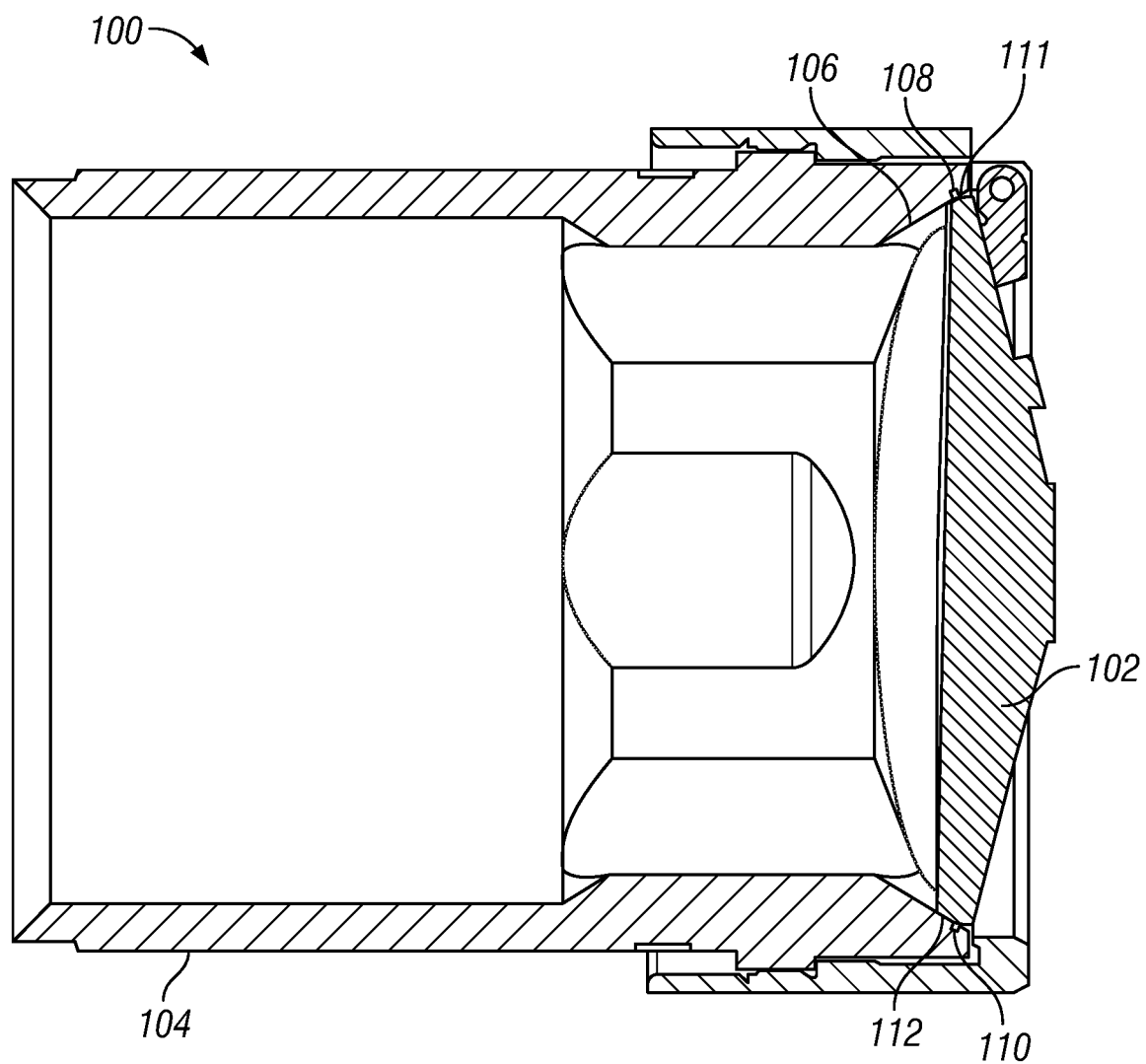
FIG. 3 is a cross section of the flapper valve assembly with the dovetail groove and the flapper in a closed position, according to one or more embodiments.
Figure 4:
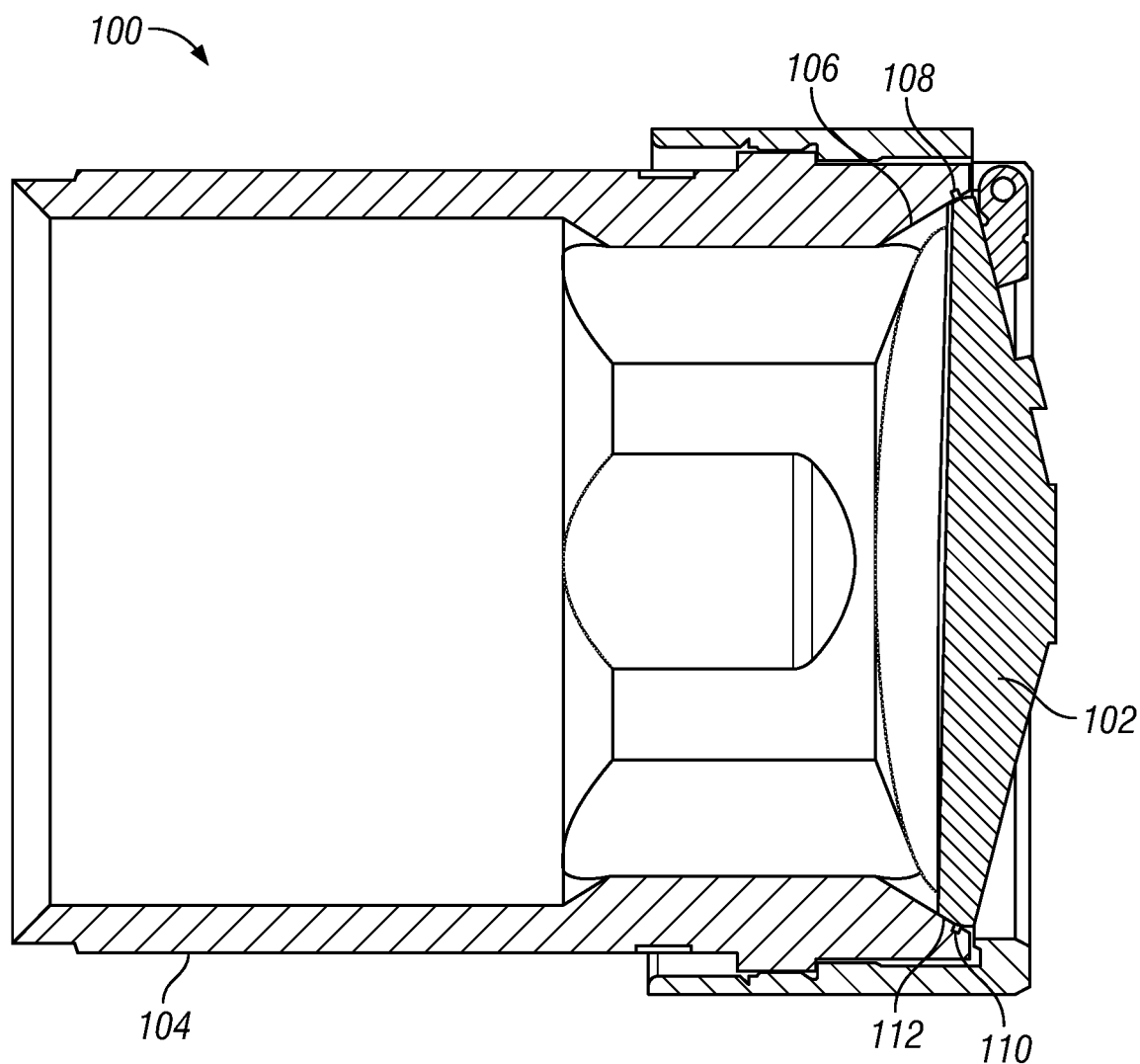
FIG. 4 is a cross section of the flapper valve assembly with the dovetail groove and the flapper in a closed position with an alternate seal location, according to one or more embodiments.

The location of the dovetail groove 108 may be modified to make contact with the flapper 102 at a different location on the seat seal surface 112. As shown in FIG. 4, the location of the dovetail groove 108 has been moved to the upper side of the seat seal surface 112. In FIG. 4, a majority of the bearing load for the metal-to-metal seal is distributed to the right, on the flapper 102. In FIG. 3 by contrast, a majority of the bearing load for the metal-to-metal seal is distributed to the left, on the valve seat 106. Varying the location of the dovetail groove 108 shifts distribution of the bearing load for the metal-to-metal seal. Thus, the location of the dovetail groove 108 can be selected to control the bearing load and seal performance.

Figure 5:
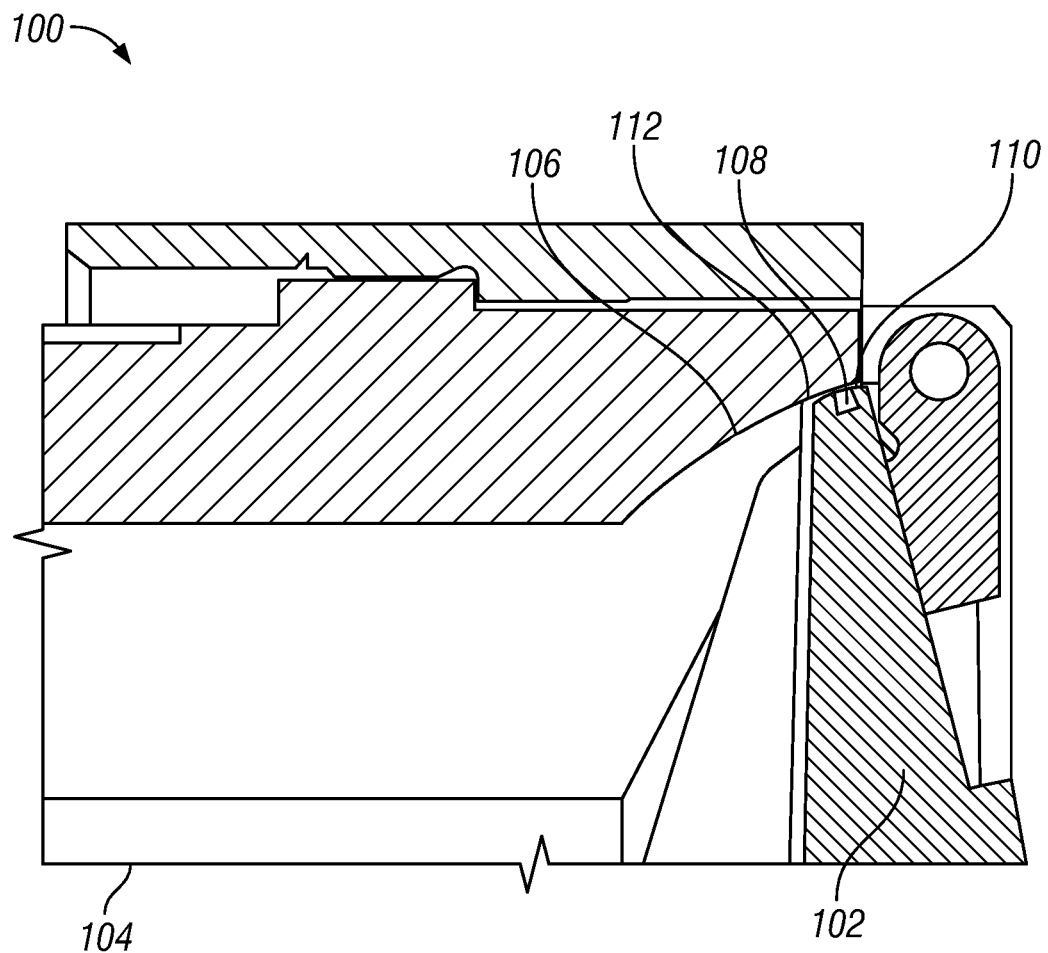
FIG. 5 is a cross section of a flapper valve assembly with a dovetail groove cut into the flapper, according to one or more embodiments.

The location of the groove 108 and the seal ring 110 may also be cut into the spherical radius of the flapper 102 instead of the seat 106 as pictured in FIG. 5.

The proposed solution can be used to enhance flapper valve assemblies 100 by optimizing the bearing area and adding a robust seal ring 110. By improving upon current spherical sealing technology, this invention will reduce engineering development time for new valve assemblies and reduce the total cost of ownership over the life of the valve. The proposed solution will also improve the reliability of valve assemblies due to higher debris tolerance and the ability to function at higher ranges of temperatures.

Figure 6:
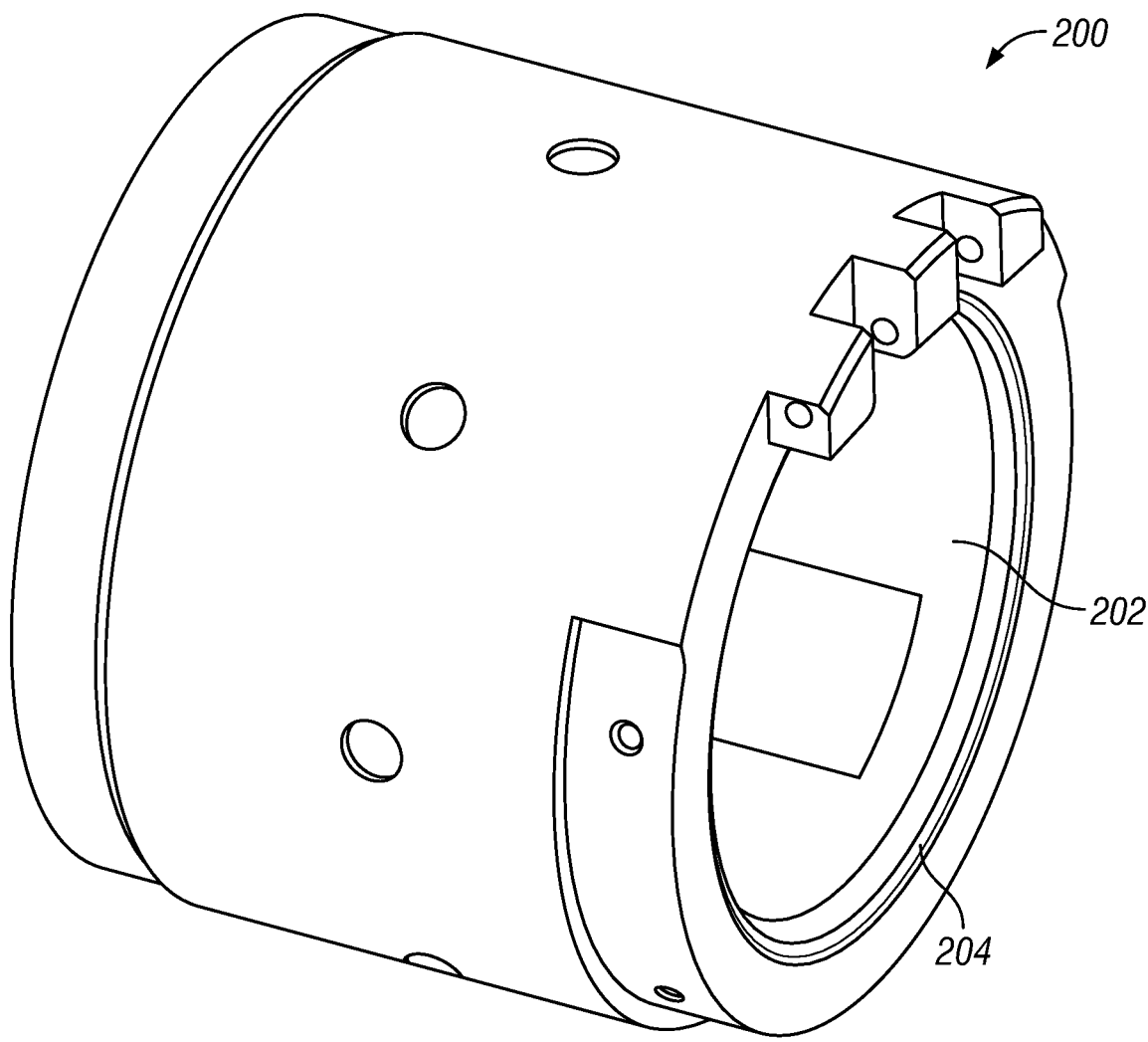
FIG. 6 is a perspective view of a valve seat with a dovetail groove cut around the valve seat on a flat plane, according to one or more embodiments.
Figure 7:
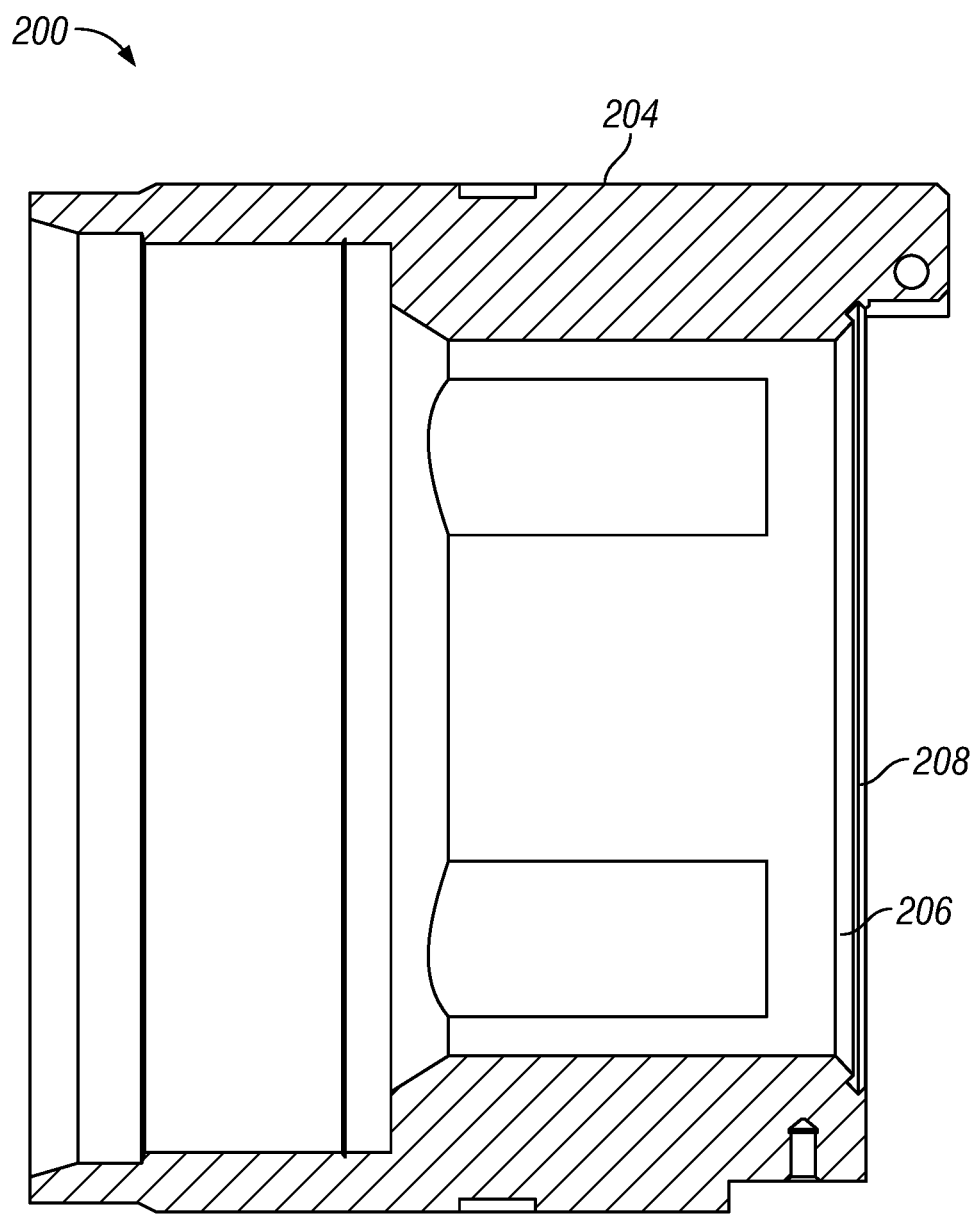
FIG. 7 is a cross section of a valve seat with the dovetail groove cut around the valve seat on a flat place, according to one or more embodiments.

FIGS. 6 and 7 show another embodiment of a flapper valve assembly 200 that includes a valve housing 204 including a valve seat 206 with a dovetail groove 208 cut around the valve seat 206 onto a flat plane. Although not shown, the flapper valve assembly includes both a flapper and a seal ring similar to the valve assembly 100 in FIGS. 1-5. The geometry of the seal ring that would go into the groove 208 allows the flapper and seal surface to hit the edge of the seal ring when rotating to the closed position. Like in the previous embodiment, the location and size relationship between the seal ring and the sealing surface can be optimized to maintain an optimum bearing area on the valve seat 206.

Figure 8:
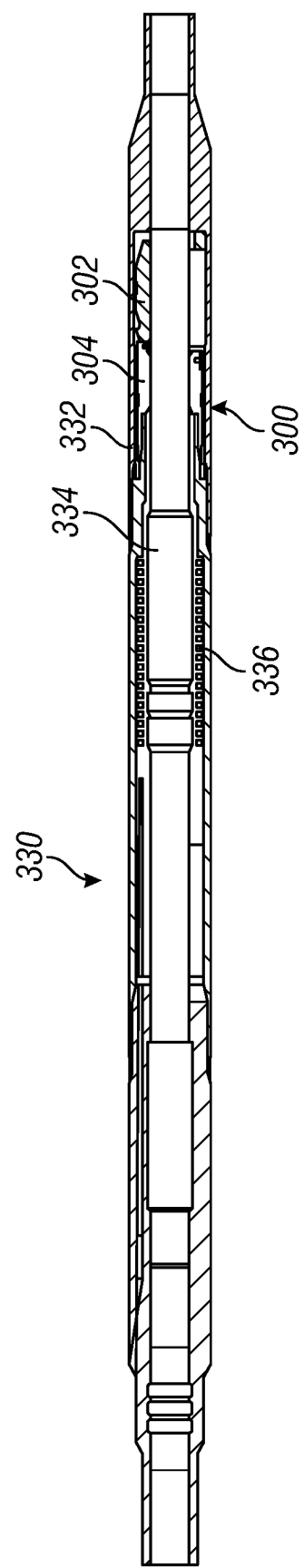
FIG. 8 is a cross section of a subsurface safety valve incorporating the flapper valve assembly and shown in an open position, according to one or more embodiments.
Figure 9:
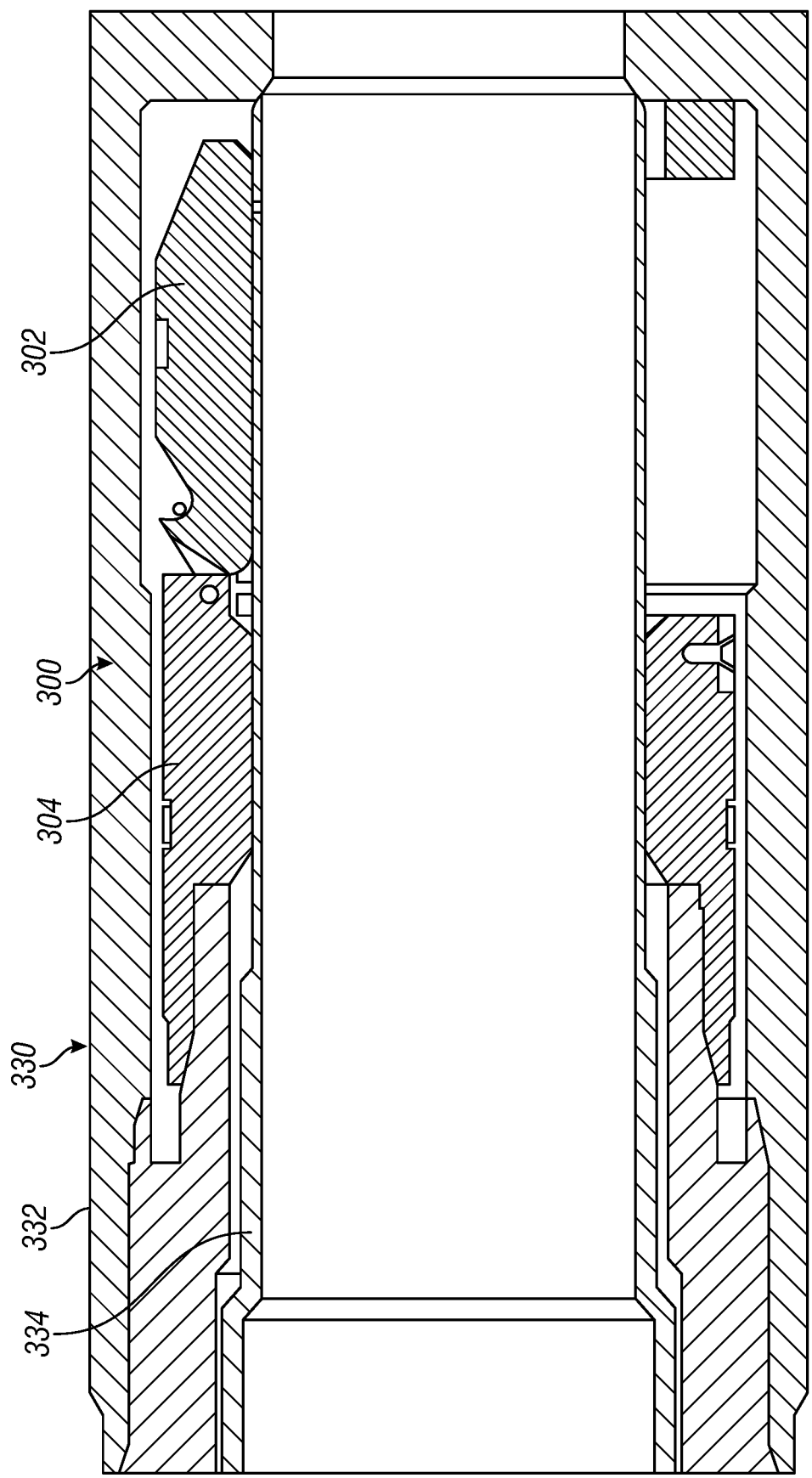
FIG. 9 is a cross section of the subsurface safety valve of FIG. 8 in the open position, according to one or more embodiments.
Figure 10:
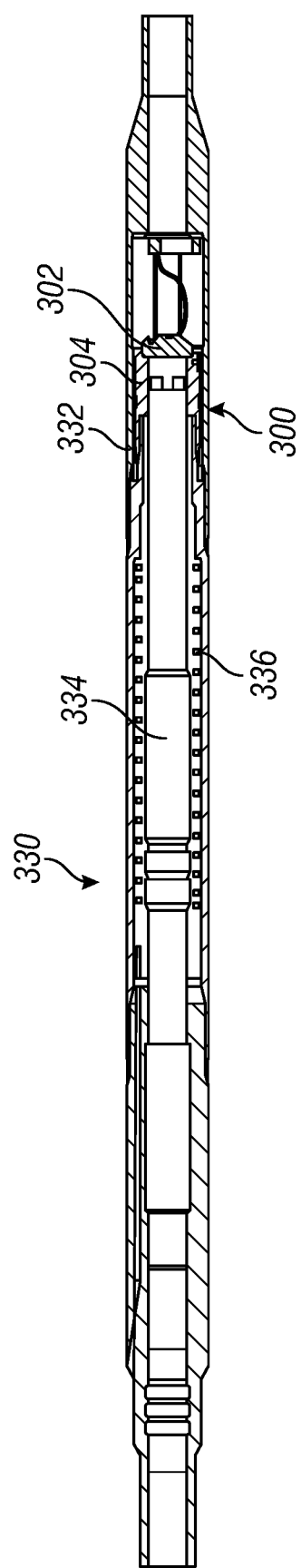
FIG. 10 is a cross section of the subsurface safety valve of FIG. 8 and shown in the closed position, according to one or more embodiments.
Figure 11:
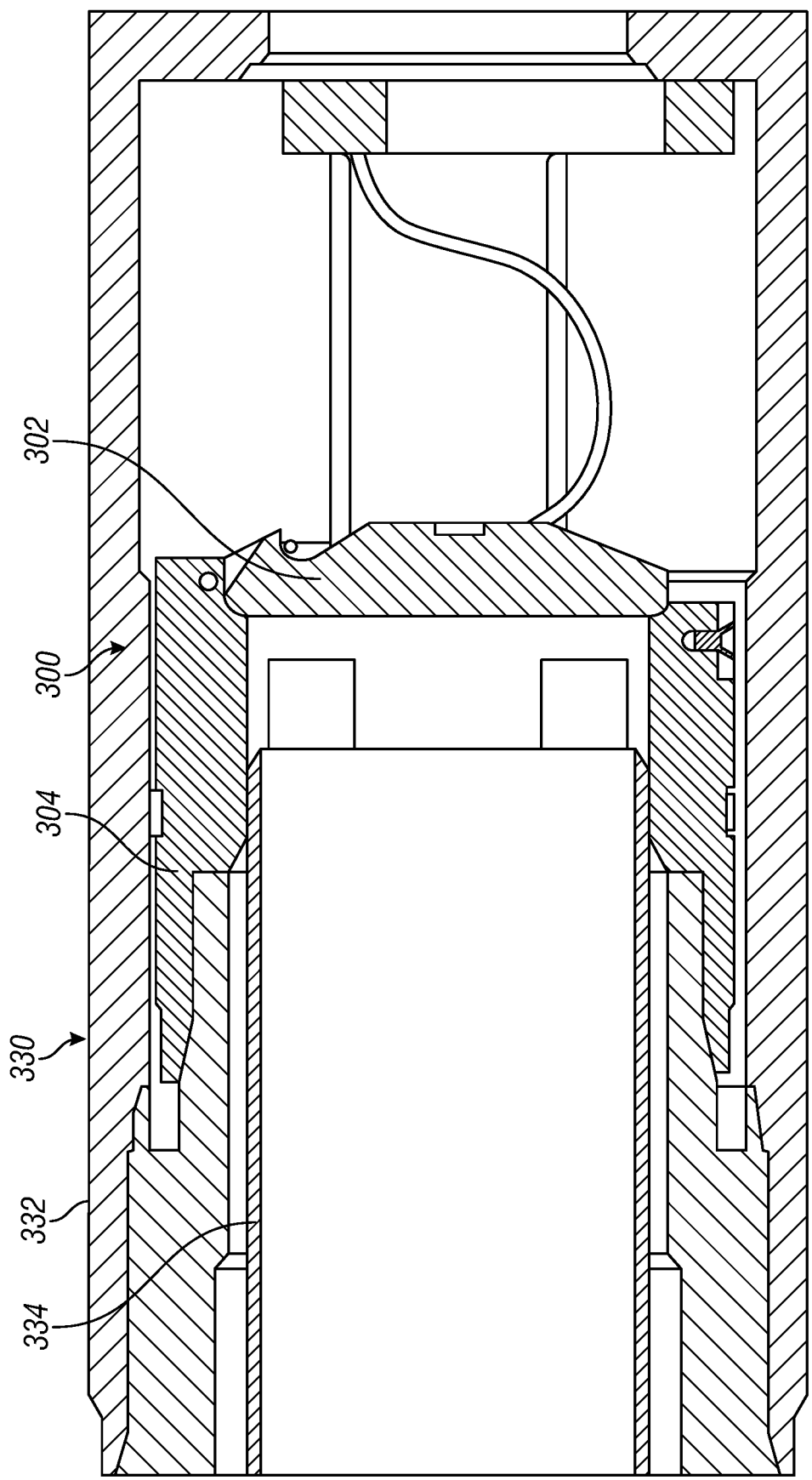
FIG. 11 is a cross section of the subsurface safety valve of FIG. 8 in the closed position, according to one or more embodiments.

FIGS. 8-11 show another embodiment of the flapper valve assembly 300 as part of a subsurface safety valve (SSSV) assembly 330 that is part of a production tubing system for a wellbore. The flapper valve assembly 300 can include similar parts and configurations as either of the previous embodiments of flapper valve assemblies 100, 200 discussed above. Similar parts and operation are discussed above and will not be repeated here. The SSSV 330 includes a valve housing 304 located within a body 332 of the SSSV 330. FIGS. 8 and 9 show the flapper valve assembly 300 in an open position. To place the flapper valve assembly 300 into the open position with the flapper 302 open to allow fluid flow through the valve assembly 300, a tubular 334 is moved within the body 332 to engage and pivot the flapper 302 into the open position. The tubular 334 may be moved, for example, by applying hydraulic pressure against the tubular 334 enough to create a force against the tubular 334 and open the flapper 302. FIGS. 10 and 11 show the flapper valve assembly 300 in a closed position. To close the flapper valve assembly 300, the tubular 334 is moved back away from the flapper 302 to allow the flapper 302 to close. Without the tubular 334 holding the flapper 302 open, the flapper 302 may close under force provided by a spring 336, for example. To move the tubular 334 to the closed position, the hydraulic pressure may be removed from the tubular 334 and force from a spring 336 that was compressed when the tubular 334 was moved to the open position may be used to return the tubular 334 to the closed position, which allows the flapper 302 to close.

Certain terms are used throughout the description and claims to refer to particular features or components. As one skilled in the art will appreciate, different persons may refer to the same feature or component by different names. This document does not intend to distinguish between components or features that differ in name but not function.

While compositions and methods are described herein in terms of "comprising" various components or steps, the compositions and methods can also "consist essentially of" or "consist of" the various components and steps.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques accepted by those skilled in the art.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:
1. A subsurface safety valve assembly, comprising:
a valve housing comprising a valve seat comprising a circumference and a seat seal surface;
a flapper rotatably connected to the valve housing and comprising a flapper seal surface, wherein the flapper is rotatable into sealing engagement with the seat seal surface in a closed position to form a circumferential surface-to-surface seal;

a dovetail groove cut into the seat seal surface or the flapper seal surface; and a seal ring held within the dovetail groove and positioned to form a seal against the seal ring when the flapper is in the closed position;

wherein the seat seal surface, the flapper seal surface, the dovetail groove, and the seal ring are shaped such that the load on the seal ring is uniform around the seal ring when the flapper is in the closed position; and wherein the dovetail groove is cut into a cross section of the seal seat surface or the flapper seal surface projected by an ellipse to create the uniform loading around the seal ring.

2. The assembly of claim 1, wherein loading on the flapper seal surface when in the closed position is controlled at least in part by at least one of width, radial distance of a minor diameter, or radial distance of a major diameter of the dovetail groove.

3. The assembly of claim 1, wherein the seat seal surface is spherical.

4. The assembly of claim 1, wherein the seat seal surface and the flapper seal surface are metal and a metal-to-metal seal is formed when the flapper is in the closed position.

5. The assembly of claim 1, wherein the load on the surface-to-surface seal is uniform around the circumference of the seat seal surface.

6. The assembly of claim 1, wherein the seat seal surface is not uniform around the circumference of the seat seal surface and the seal against the seal ring is uniform in cross section around the circumference of the seat seal surface.

7. The assembly of claim 1, wherein the dovetail groove is located in the flapper seal surface.

8. The assembly of claim 1, wherein the dovetail groove is located in the seat seal surface.

9. The assembly of claim 1, wherein the dovetail groove is shaped in a flat plane.

10. The assembly of claim 1, wherein the dovetail groove enhances the effectiveness of the surface-to-surface seal.

11. The assembly of claim 1, wherein the seat seal surface and flapper seal surface are non-uniform in cross section.

12. The assembly of claim 1, wherein the subsurface safety valve is integrated within a production tubing system.

13. The assembly of claim 1, further comprising a tubular movable to rotate the flapper into the closed position.

14. A method of using a subsurface safety valve integrated with a production tubing system:

rotating flapper to a closed position and into engagement with a valve seat so as to form a circumferential surface-to-surface seal between a flapper seal surface and a seat seal surface as well as a seal against a seal ring held within a dovetail groove cut into the circumference of the flapper seal surface or the seat seal surface; and wherein the seat seal surface, the flapper seal surface, the dovetail groove, and the seal ring are shaped such that the load on the seal ring is uniform around the seal ring when the flapper is in the closed position;

wherein the dovetail groove is cut into a cross section of the seal seat surface or the flapper seal surface projected by an ellipse to create the uniform loading around the seal ring.

15. The method of claim 14 wherein the seat seal surface and the flapper seal surface are metal and further comprising forming a metal-to-metal seal when the flapper is rotated to the closed position.

16. The method of claim 14 further comprising wherein the load on the surface-to-surface seal is uniform around the circumference of the seat seal surface.

17. The method of claim 14, wherein the seat seal surface is not uniform around the circumference of the seat seal surface and the seal against the seal ring is uniform in cross section around the circumference of the seat seal surface.

18. The method of claim 14, wherein the seat seal surface and flapper seal surface are non-uniform in cross section.

19. The method of claim 14, further comprising producing formation fluids through the subsurface safety valve when the flapper is in an open position.

* * * * *

UNITED STATES PATENT AND TRADEMARK OFFICE
CERTIFICATE OF CORRECTION

PATENT NO. : 11,661,820 B2
APPLICATION NO. : 17/511757
DATED : May 30, 2023
INVENTOR(S) : Ross Glen Dusterhoft, Charles David McFate and James Dan Vick, Jr.

Page 1 of 1

It is certified that error appears in the above-identified patent and that said Letters Patent is hereby corrected as shown below:

In the Claims

Column 5, Line 14, Claim 1, "seal seat surface" should read "seat seal surface"
Column 6, Line 21, Claim 14, "seal seat surface" should read "seat seal surface"

Signed and Sealed this
First Day of April, 2025

Coke Morgan Stewart
*Acting Director of the United States Patent and Trademark Office*